US011978414B2

(12) United States Patent
Zhao

(10) Patent No.: US 11,978,414 B2
(45) Date of Patent: May 7, 2024

(54) DISPLAY PANEL AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Li Zhao, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/609,710

(22) PCT Filed: Oct. 11, 2021

(86) PCT No.: PCT/CN2021/123050
§ 371 (c)(1),
(2) Date: Mar. 30, 2023

(87) PCT Pub. No.: WO2023/044977
PCT Pub. Date: Mar. 30, 2023

(65) Prior Publication Data

US 2024/0029677 A1 Jan. 25, 2024

(30) Foreign Application Priority Data

Sep. 27, 2021 (CN) .......................... 202111134346.7

(51) Int. Cl.
*G09G 3/36* (2006.01)

(52) U.S. Cl.
CPC ......... *G09G 3/3607* (2013.01); *G09G 3/3648* (2013.01); *G09G 2300/0426* (2013.01)

(58) Field of Classification Search
CPC ......... G09G 3/3614; G09G 2320/0233; G09G 2320/0247; G09G 2320/02;
(Continued)

(56) References Cited

U.S. PATENT DOCUMENTS 10,146,091 B2 * 12/2018 Lim .................... G09G 3/3607
10,204,576 B1 2/2019 Chen
(Continued)

FOREIGN PATENT DOCUMENTS

CN 105911780 A 8/2016
CN 106842750 A 6/2017
(Continued)

OTHER PUBLICATIONS

Chinese Office Action issued in corresponding Chinese Patent Application No. 202111134346.7 dated Apr. 12, 2022, pp. 1-10.
(Continued)

*Primary Examiner* — Koosha Sharifi-Tafreshi
(74) *Attorney, Agent, or Firm* — PV IP PC; Wei Te Chung; Zhigang Ma

(57) ABSTRACT

The present application discloses a display panel and a display device. The display panel includes a first voltage dividing signal line, a second voltage dividing signal line, and a first subpixel group and a second subpixel group alternately arranged. The first subpixel group includes at least one column of first subpixels, and the second subpixel group includes at least one column of second subpixels. The first voltage dividing signal line is electrically connected to the first subpixels and is loaded with a first voltage dividing signal, and the second voltage dividing signal line is elec-
(Continued)

trically connected to the second subpixels and is loaded with a second voltage dividing signal.

20 Claims, 6 Drawing Sheets

(58) Field of Classification Search
CPC ... G09G 2320/0204; G09G 2320/0209; G09G 2300/0452; G09G 3/3648; G09G 3/03
See application file for complete search history.

(56) References Cited

U.S. PATENT DOCUMENTS

| | | | | |
|---|---|---|---|---|
| 2016/0155404 | A1 | 6/2016 | Kim | |
| 2016/0377930 | A1 | 12/2016 | Park | |
| 2017/0103719 | A1 | 4/2017 | Zuo | |
| 2017/0154561 | A1* | 6/2017 | He | G02F 1/133514 |
| 2018/0342214 | A1 | 11/2018 | Ying | |
| 2021/0295790 | A1 | 9/2021 | Zhang | |

FOREIGN PATENT DOCUMENTS

| | | | |
|---|---|---|---|
| CN | 106855668 | A | 6/2017 |
| CN | 107272237 | A | 10/2017 |
| CN | 107643634 | A | 1/2018 |
| CN | 111323974 | A | 6/2020 |
| CN | 112198726 | A | 1/2021 |
| CN | 112799255 | A | 5/2021 |
| WO | 2021184431 | A1 | 9/2021 |

OTHER PUBLICATIONS

International Search Report in International application No. PCT/CN2021/123050, dated May 25, 2022.
Written Opinion of the International Searching Authority in International application No. PCT/CN2021/123050, dated May 25, 2022.

* cited by examiner

DISPLAY PANEL AND DISPLAY DEVICE

RELATED APPLICATIONS

This application is a Notional Phase of PCT Patent Application No. PCT/CN2021/123050 having international filing date of Oct. 11, 2021, which claims the benefit of priority of Chinese Patent Application No. 202111134346.7 filed on Sep. 27, 2021. The contents of the above applications are all incorporated by reference as if fully set forth herein in their entirety.

FIELD OF INVENTION

The present application is related to the field of display technology and specifically to a display panel and a display device with the display panel.

BACKGROUND OF INVENTION

With a development of the display technology, flat display devices such as liquid crystal displays (LCDs) have been widely used in consumer electronic products such as mobile phones, televisions, individual digital assistants, digital cameras, notebook computers, and desktop computers, due to having advantages such as high image quality, saving power, thin bodies, and wide application ranges, and have become a mainstream of display devices.

Most of the conventional LCDs are backlit LCDs, which include a housing, a liquid crystal panel arranged in the housing, and a backlight module arranged in the housing. Generally, a liquid crystal panel is made of a color filter (CF) substrate, a thin-film transistor (TFT) array substrate, and a liquid crystal layer filled between two substrates. A working principle is to control a rotation of liquid crystal molecules of the liquid crystal layer, control a light output, and refract light from the backlight module to produce a picture by applying a driving voltage on the CF substrate and the TFT array substrate. Generally, a molding process of an LCD panel generally includes: an array substrate process (e.g., film, yellow light, etching, and peeling), a color filter substrate process, and a cell process (bonding the TFT array substrate and the CF substrate).

A plurality of subpixel units arranged in an array and gate control lines and data driving lines connecting the subpixel units are usually required to be manufactured on an array substrate. During a driving process, driving polarities of two adjacent columns of the subpixel units are opposite, and grayscale differences exist, so that in a process of a positive and negative frame conversion, a bright and dark line phenomenon can easily occur.

SUMMARY OF INVENTION

The present application provides a display panel and a display device which can reduce a grayscale difference between a first subpixel group and a second subpixel group and reduce a bright and dark line phenomenon occurring during a positive and negative frame conversion of the display panel.

The present application provides a display panel, including:

a first subpixel group and a second subpixel group alternately arranged along a first direction, the first subpixel group including at least one column of first subpixels arranged along a second direction, the second subpixel group including at least one column of second subpixels arranged along the second direction, and the first direction and the second direction being perpendicular;

a plurality of first voltage dividing signal lines, the first voltage dividing signal lines being arranged along the first direction and extending along the second direction, and each of the first voltage dividing signal lines being loaded with a first voltage dividing signal; and a plurality of second voltage dividing signal lines, the second voltage dividing signal lines being arranged along the first direction and extending along the second direction, and each of the second voltage dividing signal lines being loaded with a second voltage dividing signal.

Each of the first subpixels is electrically connected to one of the first voltage dividing signal lines, each of the second subpixels is electrically connected to one of the second voltage dividing signal lines, and each of the first subpixels and each of the second subpixels are electrically compensated.

In an embodiment of the present application, the first voltage dividing signal lines include common voltage signal lines, the second voltage dividing signal lines include share voltage signal lines, the first voltage dividing signal includes a first alternating current signal, and the second voltage signal includes a second alternating current signal.

In an embodiment of the present application, the first voltage dividing signal and the second voltage dividing signal are square wave signals, and an effective voltage signal of the first voltage dividing signal is equal to an effective voltage signal of the second voltage dividing signal.

In an embodiment of the present application, in a driving process of an n-th frame, the first voltage dividing signal is a peak signal of the first alternating current signal, the second voltage dividing signal is a valley signal of the second alternating current signal, and n is an integer greater than or equal to one.

In an embodiment of the present application, in driving processes of an (n−1)-th frame and an (n+1)-th frame, the first voltage dividing signal is a valley signal of the first alternating current signal, and the second voltage dividing signal is a peak signal of the second alternating current signal.

In an embodiment of the present application, the first subpixel group includes at least two columns of the first subpixels, and the second subpixel group includes at least two columns of the second subpixels.

Between two adjacent columns of the first subpixels, one column of the first subpixels is positive frame driven, and the other column of the first subpixels is negative frame driven. Between two adjacent columns of the second subpixels, one column of the second subpixels is positive frame driven, and the other column of the second subpixels is negative frame driven.

In an embodiment of the present application, between two adjacent columns of the first subpixels and the second subpixels, one column of the first subpixels is positive frame driven, and one column of the second subpixels is negative frame driven; or one column of the first subpixels is negative frame driven, and one column of the second subpixels is positive frame driven.

In an embodiment of the present application, the display panel further includes a plurality of data signal lines arranged along the first direction, and each of the data signal lines is electrically connected to a corresponding column of the first subpixels or a corresponding column of the second subpixels.

Each of the first subpixels includes a first primary pixel transistor, a first secondary pixel transistor, and a first share transistor, and each of the second subpixels includes a second primary pixel transistor, a second secondary pixel transistor, and a second share transistor. The first primary pixel transistor, the first secondary pixel transistor, the second primary pixel transistor, and the second secondary pixel transistor are electrically connected to one of the data signal lines, the first share transistor is electrically connected to one of the first voltage dividing signal lines, and the second share transistor is electrically connected to one of the second voltage dividing signal lines.

In an embodiment of the present application, a number of columns of the first subpixels in the first subpixel group is less than or equal to six, and a number of columns of the second subpixels in the second subpixel group is less than or equal to six.

The present application further provides a display panel, including:

a first subpixel group and a second subpixel group alternately arranged along a first direction, the first subpixel group including at least one column of first subpixels arranged along a second direction, the second subpixel group including at least one column of second subpixels arranged along the second direction, and the first direction and the second direction being perpendicular;

a plurality of common voltage signal lines arranged along the first direction and extending along the second direction, each of the common voltage signal lines being loaded with a first voltage dividing signal; and a plurality of share voltage signal lines arranged along the first direction and extending along the second direction, each of the share voltage signal lines being loaded with a second voltage dividing signal.

Each of the first subpixels is electrically connected to one of the common voltage signal lines, each of the second subpixels is electrically connected to one of the share voltage signal lines, the first voltage dividing signal includes a first alternating current signal, the second voltage signal includes a second alternating current signal, and each of the first subpixels and each of the second subpixels are electrically compensated.

In an embodiment of the present application, the first voltage dividing signal and the second voltage dividing signal are square wave signals, and an effective voltage signal of the first voltage dividing signal is equal to an effective voltage signal of the second voltage dividing signal.

The present application further provides a display device, including a display panel and a device body assembled into one body.

The display panel includes:

a first subpixel group and a second subpixel group alternately arranged along a first direction, the first subpixel group including at least one column of first subpixels arranged along a second direction, the second subpixel group including at least one column of second subpixels arranged along the second direction, and the first direction and the second direction being perpendicular;

a plurality of first voltage dividing signal lines, the first voltage dividing signal lines being arranged along the first direction and extending along the second direction, and each of the first voltage dividing signal lines being loaded with a first voltage dividing signal;

a plurality of second voltage dividing signal lines, the second voltage dividing signal lines being arranged along the first direction and extending along the second direction, and each of the second voltage dividing signal lines being loaded with a second voltage dividing signal.

Each of the first subpixels is electrically connected to one of the first voltage dividing signal lines, each of the second subpixels is electrically connected to one of the second voltage dividing signal lines, and each of the first subpixels and each of the second subpixels are electrically compensated.

In an embodiment of the present application, the first voltage dividing signal lines include common voltage signal lines, the second voltage dividing signal lines include the share voltage signal lines, the first voltage dividing signal includes a first alternating current signal, and the second voltage signal includes a second alternating current signal.

In an embodiment of the present application, the first voltage dividing signal and the second voltage dividing signal are square wave signals, and an effective voltage signal of the first voltage dividing signal is equal to an effective voltage signal of the second voltage dividing signal.

In an embodiment of the present application, in a driving process of an n-th frame, the first voltage dividing signal is a peak signal of the first alternating current signal, the second voltage dividing signal is a valley signal of the second alternating current signal, and n is an integer greater than or equal to one.

In an embodiment of the present application, in driving processes of an (n−1)-th frame and an (n+1)-th frame, the first voltage dividing signal is a valley signal of the first alternating current signal, and the second voltage dividing signal is a peak signal of the second alternating current signal.

In an embodiment of the present application, the first subpixel group includes at least two columns of the first subpixels, and the second subpixel group includes at least two columns of the second subpixels.

Between the two adjacent columns of the first subpixels, one column of the first subpixels is positive frame driven, and the other column of the first subpixels is negative frame driven. Between the two adjacent columns of the second subpixels, one column of the second subpixels is positive frame driven, and the other column of the second subpixels is negative frame driven.

In an embodiment of the present application, between two adjacent columns of the first subpixels and the second subpixels, one column of the first subpixels is positive frame driven, and one column of the second subpixels is negative frame driven; or one column of the first subpixels is negative frame driven, and one column of the second subpixels is positive frame driven.

In an embodiment of the present application, the display panel further includes a plurality of data signal lines arranged along the first direction, and each of the data signal lines is electrically connected to a corresponding column of the first subpixels or a corresponding column of the second subpixels.

Each of the first subpixels includes a first primary pixel transistor, a first secondary pixel transistor, and a first share transistor, and each of the second subpixels includes a second primary pixel transistor, a second secondary pixel transistor, and a second share transistor. The first primary pixel transistor, the first secondary pixel transistor, the second primary pixel transistor, and the second secondary pixel transistor are electrically connected to one of the data signal lines, the first share transistor is electrically connected to one of the first voltage dividing signal lines, and the second share transistor is electrically connected to one of the second voltage dividing signal lines.

In an embodiment of the present application, a number of columns of the first subpixels in the first subpixel group is less than or equal to six, and a number of columns of the second subpixels in the second subpixel group is less than or equal to six.

Compared with the prior art, the present application provides the first subpixel group and the second subpixel group that are alternately arranged, the first subpixels in the first subpixel group are electrically connected to the first voltage dividing signal lines for an electrical compensation, and the second subpixels in the second subpixel group are connected to the second voltage dividing signal lines for the electrical compensation. Therefore, electrical compensation methods of the adjacent first subpixel group and the second subpixel group are different, so as to adjust compensation voltage values of the adjacent first subpixel group and the second subpixel group, thereby changing grayscale values of the first subpixels and grayscale values of the second subpixels. During a process of each of the subpixels switching between positive and negative frames, a grayscale value corresponding to a high potential is close to a grayscale value corresponding to a low potential, thereby reducing a bright and dark line phenomenon of the display panel when the positive and negative frames are switched.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

Figure 1:
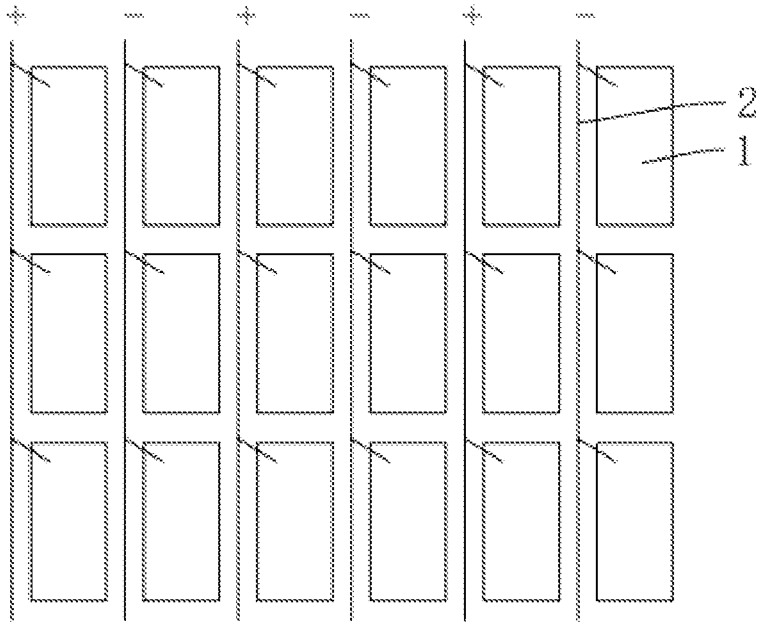
FIG. 1 is an arrangement schematic diagram of a type of subpixel of a conventional display panel.

Referring to FIG. 1, FIG. 1 is an arrangement schematic diagram of a type of subpixel of a conventional display panel, which includes a plurality of subpixels 1 arranged in rows and columns and a data line 2 connected to each column of the subpixels 1, and two adjacent ones of the columns of the subpixels 1 have opposite driving polarities. That is to say, polarities of electrical signals in two adjacent data lines 2 are opposite. Furthermore, between two adjacent ones of the columns of the subpixels 1, a first column is positive frame driven signal, and the second column is negative frame driven signal. The positive frame signal and the negative frame signal are symmetrical with respect to a color filter common electrode voltage, the positive frame signal is a positive voltage relative to the color filter common electrode voltage, and the negative frame signal is a negative voltage relative to the color filter common electrode voltage, thereby keeping a common electrode voltage of a color filter substrate unchanged. The positive frame signal and the negative frame signal can apply an electrical signal with a changed positive or negative polarity to a liquid crystal molecule, so as to achieve an alternating drive of the liquid crystal molecule. High and low potentials of a positive frame voltage and a negative frame voltage correspond to a grayscale value of a pixel light emission. The high potential corresponds to a first grayscale value H, the low potential voltage corresponds to the second grayscale value L, the first grayscale value is a bright state, the second grayscale value is a dark state, so that a grayscale value corresponding to two adjacent ones of the columns of the subpixels 1 are different. In this way, during frame transition, a display panel alternately switches between positive frame pixels and negative frame pixels. Since a frequency of the subpixels 1 that are alternating in bright and dark is the same in a same period of time, an entire display panel easily forms dynamic dark lines, which affects a display effect.

Figure 2:
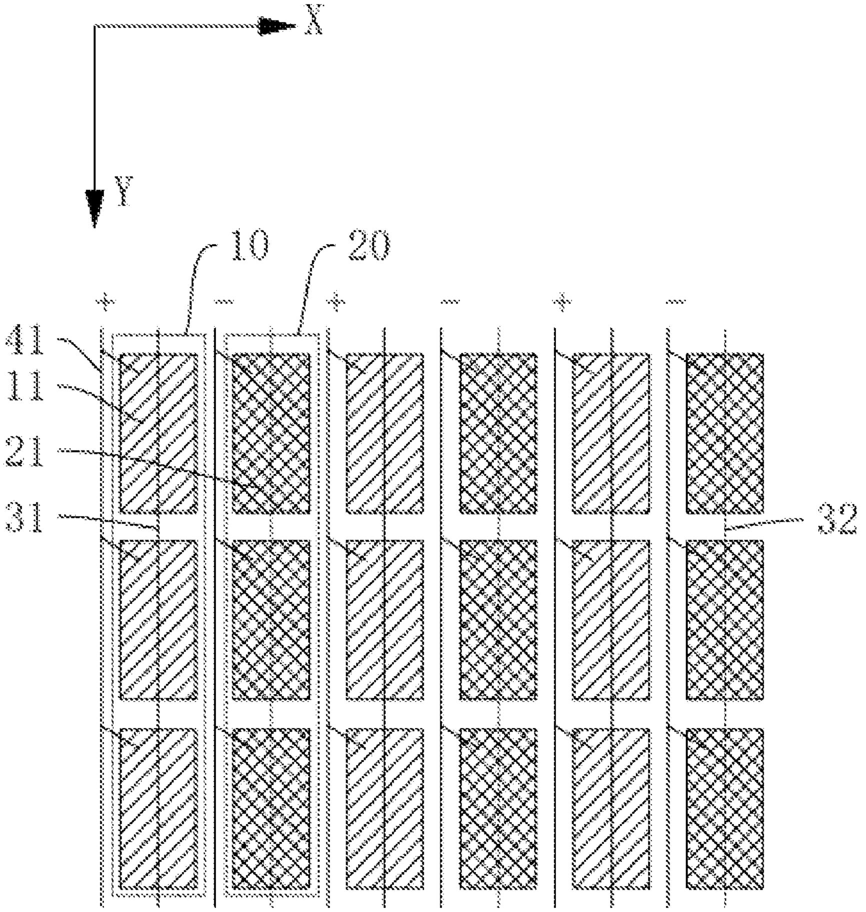
FIG. 2 is an arrangement schematic diagram of a type of subpixel provided by an embodiment of the present application.

An embodiment of the present application provides a display panel. Referring to FIG. 2, the display panel includes a first subpixel group 10, a second subpixel group 20, a plurality of first voltage dividing signal lines 31, and a plurality of second voltage dividing signal lines 32.

The first subpixel group 10 and the second subpixel group 20 are arranged along a first direction X and alternately arranged. The first subpixel group 10 includes at least one column of first subpixels 11 arranged along a second direction Y, the second subpixel group 20 includes at least one column of second subpixels 21 arranged along the second direction Y, and the first direction X and the second direction Y are perpendicular to each other.

Furthermore, each of the first voltage dividing signal lines 31 is arranged along the first direction X and extending along the second direction Y. Each of the second voltage dividing signal lines 32 is arranged along the first direction X and extending along the second direction Y. The first voltage dividing signal lines 31 are loaded with first voltage dividing signals, and the second voltage dividing signal lines 32 are loaded with second voltage dividing signals.

Each of the first subpixels 11 is electrically connected to the first voltage dividing signal lines 31, and each of the second subpixels 21 is electrically connected to the second voltage dividing signal lines 32, so as to electrically compensate each of the first subpixels 11 and each of the second subpixels 21.

In a process of implementation and application, an embodiment of the present application alternately arranges the first subpixel group 10 and the second subpixel group 20. The first subpixels 11 in the first subpixel group 10 are connected to the first voltage dividing signal lines 31 for an electrical compensation, and the second subpixels 21 in the second subpixel group 20 are connected to the second voltage dividing signal lines 32 for the electrical compensation. Therefore, the adjacent first subpixel group 10 and the second subpixel group 20 adopt different signal lines and signals for the electrical compensation, so as to change electrical compensation methods of the adjacent first subpixel group 10 and the second subpixel group 20 to adjust compensation voltage values of the adjacent first subpixel group 10 and the second subpixel group 20, thereby changing grayscale values of the first subpixels 11 and grayscale values of the second subpixels 21. During a process of each of subpixels switching between positive and negative frames, a grayscale value corresponding to the high potential is close to a grayscale value corresponding to the low potential, thereby reducing a bright and dark line phenomenon of the display panel when the positive and negative frames are switched.

It should be noted that in an embodiment of the present application, the first voltage dividing signal lines 31 and the second voltage dividing signal lines 32 are different signal lines, and signal input terminals connected thereto are not the same. Optionally, the first voltage dividing signal lines 31 are common voltage signal line and the second voltage dividing signal lines 32 are shared voltage signal lines. That is to say, in an embodiment of the present application, the first voltage dividing signal is a common voltage signal, and the second voltage dividing signal is a shared voltage signal, so as to electrically compensate each of the first subpixels 11 and each of the second subpixels 21.

Specifically, the display panel provided in embodiments of the present application will be described below in conjunction with specific implementations.

Figure 3:
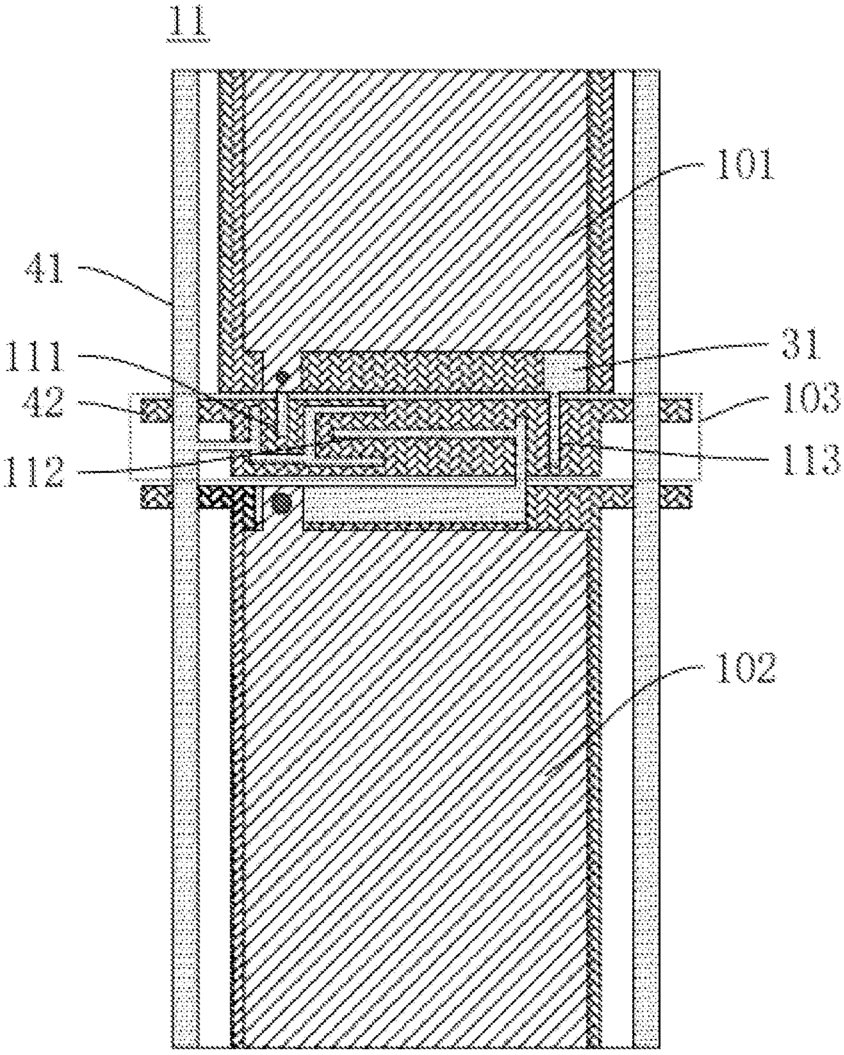
FIG. 3 is a planar structural schematic diagram of a first subpixel provided by an embodiment of the present application.
Figure 4:
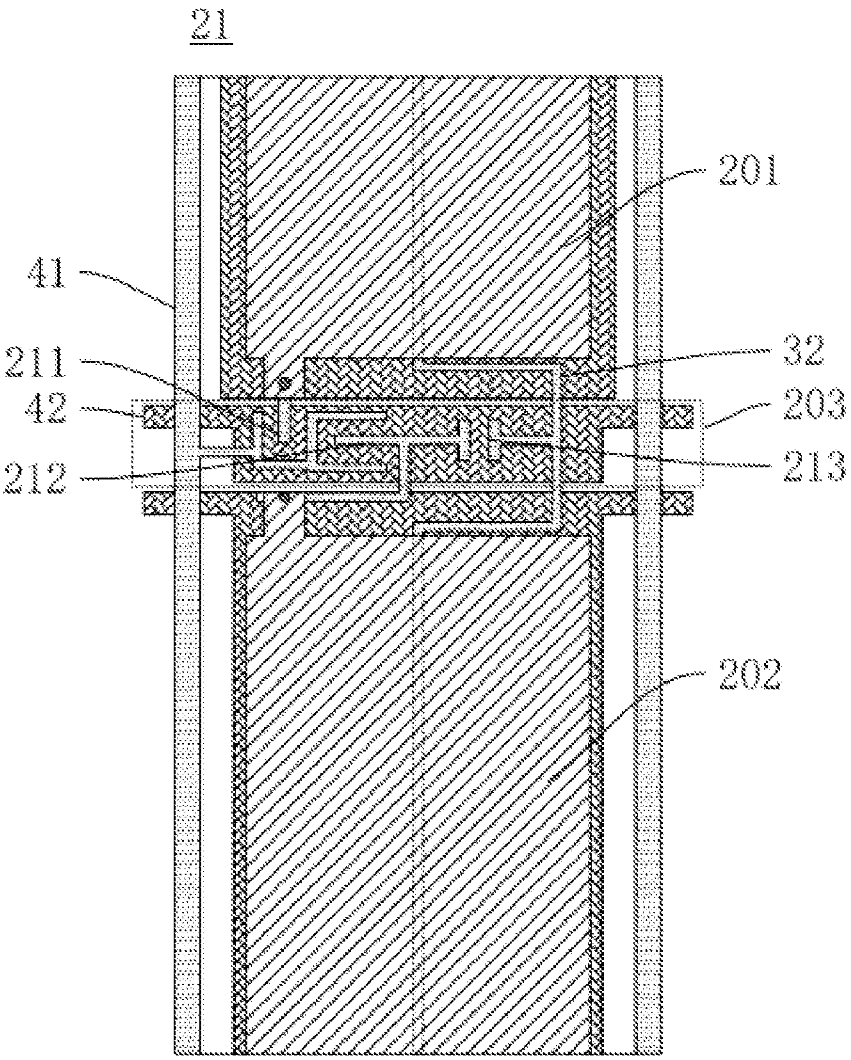
FIG. 4 is a planar structural schematic diagram of a first subpixel provided by an embodiment of the present application.

Referring to FIG. 2, FIG. 3, and FIG. 4, in an embodiment of the present application, the display panel includes the subpixels arranged in rows and columns along the first direction X and the second direction Y. The subpixels are distributed as the first subpixel group 10 and the second subpixel group 20 arranged along the first direction X. Furthermore, the first subpixel group 10 and the second subpixel group 20 are arranged along the first direction X alternately. Specifically, as shown in FIG. 2, from left to right sequentially are the first subpixel group 10, the second subpixel group 20, the first subpixel group 10, the second subpixel group 20, etc. The above-mentioned arrangement is taken as an example in an embodiment of the present application for description.

The first subpixel group 10 includes a column of the first subpixels 11 arranged along the second direction Y, and the second subpixel group 20 includes a column of second subpixels 21 arranged along the second direction Y.

Furthermore, the subpixels include red subpixels, green subpixels, and blue subpixels. A specific arrangement can include, from left to right, the first subpixels 11 in a first column are the red subpixels, the first subpixels 11 in a second column are the green subpixels, the first subpixels 11 in a third column are the blue subpixels, the second subpixels 21 in a fourth column are the red subpixels, the first subpixels 11 in a fifth column are the green subpixels, and the second subpixels 21 in the sixth column are the blue subpixels. The above-mentioned arrangement is taken as an example in this embodiment, but it is not limited thereto.

The display panel further includes the first voltage dividing signal lines 31, the second voltage dividing signal lines 32, and a plurality of data signal lines 41, arranged along the first direction X and extending along the second direction Y, and a plurality of scanning signal lines 42 arranged along the second direction Y and extending along the first direction X. In addition, the first voltage dividing signal lines 31 are loaded with the first voltage dividing signals, the second voltage dividing signal lines 32 are loaded with the second voltage dividing signal, the data signal lines 41 are loaded with data signals, and the scanning signal lines 42 are loaded with scanning signals.

Each of the data signal lines 41 is electrically connected to a corresponding column of the first subpixels 11 or a corresponding column of the second subpixels 21 to transmit data signals to each of the first subpixels 11 and each of the second subpixels 21, so that each of the first subpixels 11 and each of the second subpixels 21 achieves a display function. In this embodiment, a driving polarity of any column of the first subpixels 11 is opposite to a driving polarity of an adjacent column of the second subpixels 21. For example, in an n-th frame driving process, driving polarities of the first subpixels 11 in each of the columns is positive, and driving polarities of the second subpixel 21 in each of the columns is negative. In an (n−1)-th frame driving process, the driving polarities of the first subpixels 11 in each of the columns is negative, and the driving polarities of the second subpixels 21 in each of the columns is positive, and n is an integer greater than or equal to 1.

Each of the first voltage dividing signal lines 31 is electrically connected to a corresponding column of the first subpixels 11 to transmit the first voltage dividing signals to each of the first subpixels 11, so as to electrically connect to each of the first subpixels 11 for the electrical compensation. Each of the second voltage dividing signal lines 32 is electrically connected to a corresponding column of the second subpixels 21 to transmit the second voltage dividing signals to each of the second subpixels 21 for the electrical compensation.

In an embodiment of the present application, the first subpixels 11 and the second subpixels 21 are connected to different voltage dividing signal lines for the electrical compensation. That is to say, the first subpixel group 10 and the second subpixel group 20 adopt different electrical compensation methods. Therefore, the adjacent first subpixel group 10 and the second subpixel group 20 adopt different signal lines and signals for the electrical compensation, so as to change the electrical compensation methods of the adjacent first subpixel group 10 and the second subpixel group 20 to adjust the compensation voltage values of the adjacent first subpixel group 10 and the second subpixel group 20, thereby changing the grayscale values of the first subpixels 11 and the grayscale values of the second subpixels 21. During the process of each of the subpixels switching between the positive and negative frames, the grayscale value corresponding to the high potential is close to the grayscale value corresponding to the low potential, thereby reducing the bright and dark line phenomenon of the display panel when the positive and negative frames are switched.

Furthermore, references are further made to FIG. 2, FIG. 3, and FIG. 4. FIG. 3 is a planar structural schematic diagram of a first subpixel provided by an embodiment of the present application. FIG. 4 is a planar structural schematic diagram of a first subpixel provided by an embodiment of the present application.

For a first subpixel 11, each of the first subpixels 11 is connected to a data signal line 41 and a scanning signal line 42. Specifically, the first subpixel 11 includes a first primary subpixel region 101, a first secondary subpixel region 102, and a first transistor region 103. The first subpixel 11 includes a first primary pixel electrode positioned in the first primary subpixel region 101, a first secondary pixel electrode positioned in the first secondary subpixel region 102, a first primary transistor 111, a first secondary transistor 112, and a first shared transistor 113 that are positioned in the first transistor region 103.

In the first primary transistor 111, a source is connected to the data signal line 41, a drain is connected to the first primary pixel electrode positioned in the first primary subpixel region 101, and a gate is connected to the scanning signal line 42. In the first secondary transistor 112, a source is connected to the data signal line 41, a drain is connected to the first secondary pixel electrode positioned in the first secondary subpixel region 102, and a gate is connected to the scanning signal line 42. In the first shared transistor 113, a source is connected to a drain of the first secondary transistor 112, a source is connected to a first voltage dividing signal line 31, and a gate is connected to the scanning signal line 42. That is to say, the first subpixel 11 is connected to the first voltage dividing signal line 31 through the first shared transistor 113, so as to leak electricity to the first secondary subpixel region 102, i.e., the electrical compensation.

It should be noted that, in this embodiment, the first voltage dividing signal line 31 is a common voltage signal line, and a first voltage dividing signal is a common voltage signal.

For a second subpixel 21, each of the second subpixels 21 is connected to the data signal line 41 and the scanning signal line 42. Specifically, the second subpixel 21 includes a second primary subpixel region 201, a second secondary subpixel region 202, and a second transistor region 203. The second subpixel 21 includes a second primary pixel electrode positioned in the second primary subpixel region 201, a second secondary pixel electrode positioned in the second secondary subpixel region 202, and the second primary transistor 211, the second secondary transistor 212, and the second shared transistor 213 positioned in the second transistor region 203.

In the second primary transistor 211, a source is connected to the data signal line 41, a drain is connected to the second primary pixel electrode in the second primary subpixel region 201, and a gate is connected to the scanning signal line 42. In of the second secondary transistor 212, a source is connected to the data signal line 41, a drain is connected to the second secondary pixel electrode in the second secondary subpixel region 202, and a gate is connected to the scanning signal line 42. In of the second shared transistor 213, a source is connected to a drain of the second secondary transistor 212, a source is connected to the second voltage dividing signal line 32, and a gate is connected to the scanning signal line 42. That is to say, the second subpixels 21 are connected to the second voltage dividing signal line 32 through the second shared transistor 213, so as to leak electricity to the electrical compensation.

It should be noted that, in this embodiment, the second voltage dividing signal line 32 is the shared voltage signal line, and the second voltage dividing signals are the shared voltage signals.

In the embodiment of the present application, both the first voltage dividing signal and the second voltage dividing signal are alternating current (AC) signals. Furthermore, referring to FIG. 5, the first voltage dividing signal provided in this embodiment of the application is a first AC signal V1, the second voltage dividing signal is a second AC signal V2. The first AC signal V1 and the second AC signal V2 are both square-wave signals, and an effective voltage value of the first voltage dividing signal and the second voltage dividing signal are equal.

In the n-th frame driving process, the first voltage dividing signal is a peak signal V11 of the first AC signal V1, and the second voltage dividing signal is a valley signal V21 of the second AC signal V2. In a driving process of the (n−1)-th frame and an (n+1)-th frame, the first voltage dividing signal is the valley signal V12 of the first AC signal V1, and the second voltage dividing signal is the peak signal V22 of the second AC signal V2.

It can be understood that a frequency of the first voltage dividing signal and a frequency of the second voltage dividing signal are both in one frame, and in each of the frames, a peak of the first voltage dividing signal corresponds to a valley of the second voltage dividing signal or a valley of the first voltage dividing signal corresponds to a peak of the second voltage dividing signal.

Figure 5:
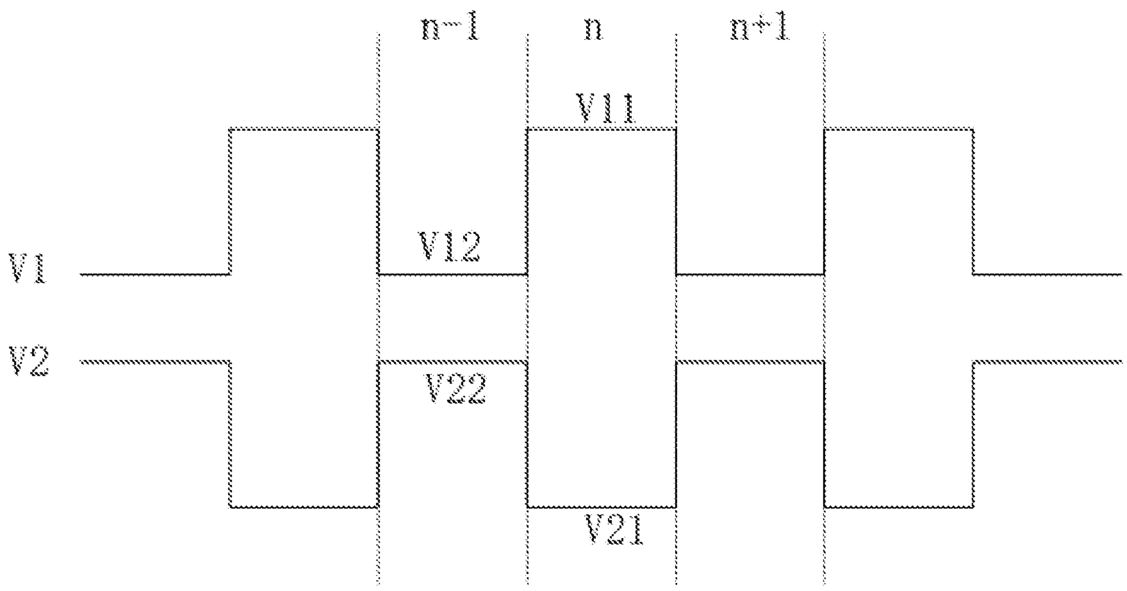
FIG. 5 is a waveform of a first voltage dividing signal line and a second voltage dividing signal line provided by an embodiment of the present application.

Referring to FIG. 2 and FIG. 5, for example, in the n-th frame driving process, the first subpixel 11 is positive frame driven, and the second subpixel 21 is negative frame driven. In addition, the first subpixel 11 is connected to the first voltage dividing signal line 31 for the electrical compensation, and a voltage loaded on the first voltage division signal line 31 is the peak signal V11. The second subpixel 21 is connected to the second voltage signal line 32 for the electrical compensation, and a voltage loaded on the second voltage division signal line 32 is the valley signal V21. In the (n−1)-th and the (n+1)-th frames, the first subpixel 11 is negative frame driven, and the second subpixel 21 is positive frame driven. In addition, the first subpixel 11 is connected to the first voltage dividing signal line 31 for the electrical compensation, and the voltage loaded on the first voltage dividing signal line 31 is the valley signal V12. The second subpixel 21 is connected to the second voltage dividing signal line 32 for the electrical compensation, and the voltage loaded on the second voltage dividing signal line 32 is the peak signal V22. Therefore, in an embodiment of the present application, the first subpixel 11 and the second subpixel 21 adopt different voltage signals for the electrical compensation. Therefore, the adjacent first subpixel group 10 and the second subpixel group 20 adopt different signal lines and voltage signals for electrical compensation, so as to change the electrical compensation methods of the adjacent first subpixel group 10 and the second subpixel group 20 to adjust the compensation voltage values of the adjacent first subpixel group 10 and the second subpixel group 20, thereby changing the grayscale values of the first subpixels 11 and the grayscale values of the second subpixels 21. During the process of each of the subpixels switching between the positive and negative frames, the grayscale value corresponding to the high potential is close to the grayscale value corresponding to the low potential, thereby reducing the bright and dark line phenomenon of the display panel when the positive and negative frames are switched.

Figure 6:
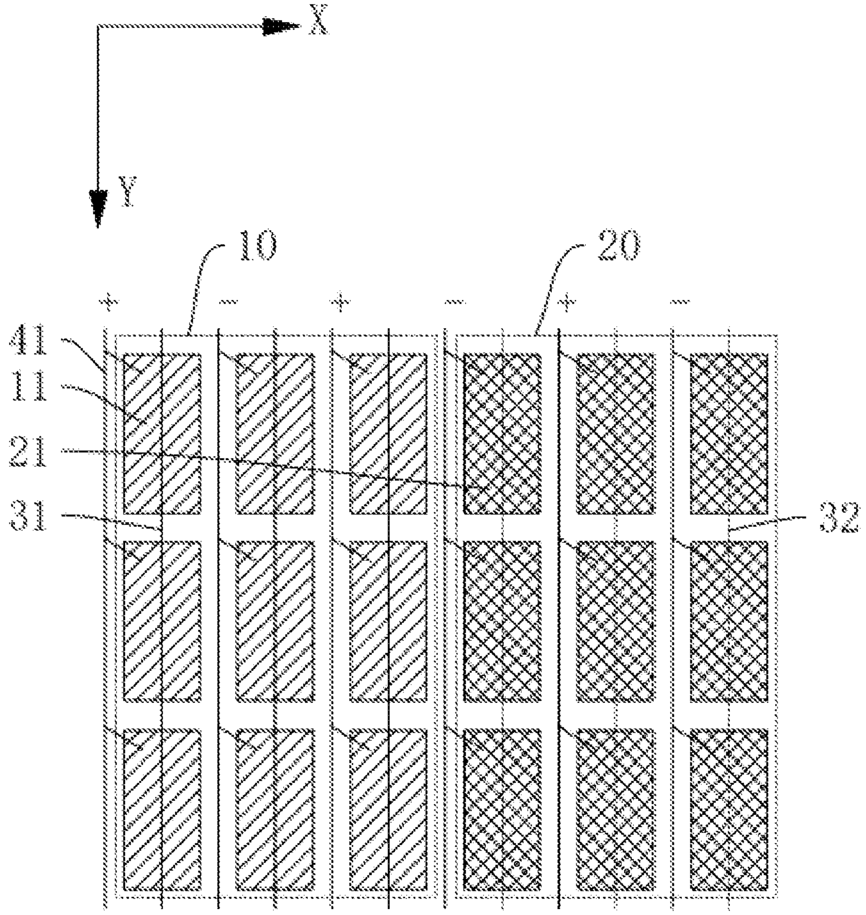
FIG. 6 is an arrangement schematic diagram of another type of subpixel provided by an embodiment of the present application.

In another embodiment of the present application, referring to FIG. 6, in this embodiment, the display panel includes the subpixels arranged in rows and columns along the first direction X and the second direction Y. The subpixels are distributed as the first subpixel group 10 and the second subpixel group 20 arranged along the first direction X. Furthermore, the first subpixel group 10 and the second subpixel group 20 are arranged along the first direction X alternately. Specifically, as shown in FIG. 2, from left to right sequentially are the first subpixel group 10, the second subpixel group 20, the first subpixel group 10, the second subpixel group 20, etc. The above-mentioned arrangement is taken as an example in an embodiment of the present application for description.

The first subpixel group 10 includes three columns of the first subpixels 11 arranged along the second direction Y, and the second subpixel group 20 includes three columns of the second subpixels 21 arranged along the second direction Y.

Furthermore, the subpixels include the red subpixels, the green subpixels, and the blue subpixels. A specific arrangement can include, from left to right, the first subpixels 11 in a first column are the red subpixels, the first subpixels 11 in a second column are the green subpixels, the first subpixels 11 in a third column are the blue subpixels, the second subpixels 21 in a fourth column are the red subpixels, the second subpixels 21 in a fifth column are the green subpixels, and the second subpixels 21 in the sixth column are the blue subpixels. The above-mentioned arrangement is taken as an example in this embodiment, but it is not limited thereto.

In addition, in this embodiment, driving polarities of the first subpixels 11 in two adjacent columns are opposite, driving polarities of the second subpixels 21 in two adjacent columns are opposite, and the driving polarities of the first subpixels 11 and the second subpixels 21 in two adjacent columns are opposite.

In this embodiment, the first subpixel 11 is connected to the first voltage dividing signal line 31 for electrical compensation, and the second subpixel 21 is connected to the second voltage dividing signal line 32 for electrical compensation. Referring to the previous embodiment, both the first voltage dividing signal and the second voltage dividing signal can be the square wave signals, and the frequency of the first voltage dividing signal and the frequency of the second voltage dividing signal are both in one frame, and in each of the frames, the peak of the first voltage dividing signal corresponds to the valley of the second voltage dividing signal or the valley of the first voltage dividing signal corresponds to the peak of the second voltage dividing signal. Therefore, in an embodiment of the present application, the first subpixel 11 and the second subpixel 21 adopt different voltage signals for the electrical compensation. Therefore, the adjacent first subpixel group 10 and the second subpixel group 20 adopt different signal lines for electrical compensation, so as to change the electrical compensation methods of the adjacent first subpixel group 10 and the second subpixel group 20 to adjust the compensation voltage values of the adjacent first subpixel group 10 and the second subpixel group 20, thereby changing the grayscale values of the first subpixels 11 and the grayscale values of the second subpixels 21. During the process of each of the subpixels switching between the positive and negative frames, the grayscale value corresponding to the high potential is close to the grayscale value corresponding to the low potential, thereby reducing the bright and dark line phenomenon of the display panel when the positive and negative frames are switched.

It should be noted that, in an embodiment of the present application, for the adjacent first subpixel group 10 and the second subpixel group 20, different signal lines and signals are adopted for the electrical compensation. That is to say, the first subpixels 11 electrically compensate through the first voltage dividing signal lines 31, and the second subpixels 21 electrically compensate through the second voltage dividing signal lines 32. Specifically, the first voltage dividing signals in the first voltage dividing signal lines 31 and the second voltage dividing signals in the second voltage dividing signal lines 32 can be set according to actual requirements to adjust the compensation voltage values of the adjacent first subpixel group 10 and the second subpixel group 20, thereby adjusting the grayscale values of the first subpixels 11 and the grayscale values of the second subpixels 21. During the process of each of the subpixels switching between the positive and the negative frames, the grayscale values of the first subpixels 11 are close to the grayscale values of the second subpixels 21, thereby reducing the bright and dark line phenomenon of the display panel when the positive and negative frames are switched.

Subsequently, if a number of columns of the first subpixels 11 in the first subpixel group 10 and a number of columns of the second subpixel 21 in the second subpixel group 20 are too large, it will result in a distance along the first direction X of the first subpixel group 10 or the second subpixel group being too large. Macroscopically, a vertical bright and dark line phenomenon generated in each of the first subpixel group 10 or the second subpixel group cannot be effectively eliminated. In an embodiment of the present application, the number of columns of the first subpixels 11 in the first subpixel group 10 and the number of columns of the second subpixels 21 in the second subpixel group 20 can also be 2, 4, 5, or 6. That is to say, in an embodiment of the present application, the number of columns of the first subpixels 11 in the first subpixel group 10 and the number of columns of the second subpixel 21 in the second subpixel group 20 are both less than or equal to 6, so as to ensure an effective reduction of the vertical bright and dark line phenomenon on the display panel.

In addition, an embodiment of the present application further provides a display device. The display device includes the display panel described in the above-mentioned embodiment and a device body. A structural and a pixel arrangement of the display panel can be the same as those in the above-mentioned embodiment, and will not be reiterated herein. The display panel and the device body are assembled into one body.

In the above embodiments, the descriptions of the various embodiments are different in emphases, for contents not described in detail, please refer to related description of other embodiments.

The display panel and the display device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A display panel, comprising:

a first subpixel group and a second subpixel group alternately arranged along a first direction, wherein the first subpixel group comprises at least one column of first subpixels arranged along a second direction, the second subpixel group comprises at least one column of second subpixels arranged along the second direction, and the first direction and the second direction are perpendicular;

a plurality of first voltage dividing signal lines, wherein the first voltage dividing signal lines are arranged along the first direction and extending along the second direction, and each of the first voltage dividing signal lines is loaded with a first voltage dividing signal; and a plurality of second voltage dividing signal lines, wherein the second voltage dividing signal lines are arranged along the first direction and extending along the second direction, and each of the second voltage dividing signal lines is loaded with a second voltage dividing signal;

wherein each of the first subpixels is electrically connected to one of the first voltage dividing signal lines, each of the second subpixels is electrically connected to one of the second voltage dividing signal lines, and each of the first subpixels and each of the second subpixels are electrically compensated.

2. The display panel according to claim 1, wherein the first voltage dividing signal lines comprise common voltage signal lines, the second voltage dividing signal lines comprise share voltage signal lines, the first voltage dividing signal comprises a first alternating current signal, and the second voltage signal comprises a second alternating current signal.

3. The display panel according to claim 2, wherein the first voltage dividing signal and the second voltage dividing signal are square wave signals, and an effective voltage signal of the first voltage dividing signal is equal to an effective voltage signal of the second voltage dividing signal.

4. The display panel according to claim 3, wherein in a driving process of an n-th frame, the first voltage dividing signal is a peak signal of the first alternating current signal, the second voltage dividing signal is a valley signal of the second alternating current signal, and n is an integer greater than or equal to one.

5. The display panel according to claim 4, wherein in driving processes of an (n−1)-th frame and an (n+1)-th frame, the first voltage dividing signal is a valley signal of the first alternating current signal, and the second voltage dividing signal is a peak signal of the second alternating current signal.

6. The display panel according to claim 1, wherein the first subpixel group comprises at least two columns of the first subpixels, and the second subpixel group comprises at least two columns of the second subpixels;

between two adjacent columns of the first subpixels, one column of the first subpixels is positive frame driven, and the other column of the first subpixels is negative frame driven; and between two adjacent columns of the second subpixels, one column of the second subpixels is positive frame driven, and the other column of the second subpixels is negative frame driven.

7. The display panel according to claim 6, wherein between two adjacent columns of the first subpixels and the second subpixels, one column of the first subpixels is positive frame driven, and one column of the second subpixels is negative frame driven; or one column of the first subpixels is negative frame driven, and one column of the second subpixels is positive frame driven.

8. The display panel according to claim 1, wherein the display panel further comprises a plurality of data signal lines arranged along the first direction, and each of the data signal lines is electrically connected to a corresponding column of the first subpixels or a corresponding column of the second subpixels;

each of the first subpixels comprises a first primary pixel transistor, a first secondary pixel transistor, and a first share transistor, and each of the second subpixels comprises a second primary pixel transistor, a second secondary pixel transistor, and a second share transistor; and the first primary pixel transistor, the first secondary pixel transistor, the second primary pixel transistor, and the second secondary pixel transistor are electrically connected to one of the data signal lines, the first share transistor is electrically connected to one of the first voltage dividing signal lines, and the second share transistor is electrically connected to one of the second voltage dividing signal lines.

9. The display panel according to claim 1, wherein a number of columns of the first subpixels in the first subpixel group is less than or equal to six, and a number of columns of the second subpixels in the second subpixel group is less than or equal to six.

10. A display panel, comprising:

a first subpixel group and a second subpixel group alternately arranged along a first direction, wherein the first subpixel group comprises at least one column of first subpixels arranged along a second direction, the second subpixel group comprises at least one column of second subpixels arranged along the second direction, and the first direction and the second direction are perpendicular;

a plurality of common voltage signal lines arranged along the first direction and extending along the second direction, wherein each of the common voltage signal lines is loaded with a first voltage dividing signal; and a plurality of share voltage signal lines arranged along the first direction and extending along the second direction, wherein each of the share voltage signal lines is loaded with a second voltage dividing signal;

wherein each of the first subpixels is electrically connected to one of the common voltage signal lines, each of the second subpixels is electrically connected to one of the share voltage signal lines, the first voltage dividing signal comprises a first alternating current signal, the second voltage signal comprises a second alternating current signal, and each of the first subpixels and each of the second subpixels are electrically compensated.

11. The display panel according to claim 10, wherein the first voltage dividing signal and the second voltage dividing signal are square wave signals, and an effective voltage signal of the first voltage dividing signal is equal to an effective voltage signal of the second voltage dividing signal.

12. A display device, comprising a display panel and a device body assembled into one body;

wherein the display panel comprises:

a first subpixel group and a second subpixel group alternately arranged along a first direction, wherein the first subpixel group comprises at least one column of first subpixels arranged along a second direction, the second subpixel group comprises at least one column of second subpixels arranged along the second direction, and the first direction and the second direction are perpendicular;

a plurality of first voltage dividing signal lines, wherein the first voltage dividing signal lines are arranged along the first direction and extending along the second direction, and each of the first voltage dividing signal lines is loaded with a first voltage dividing signal;

a plurality of second voltage dividing signal lines, wherein the second voltage dividing signal lines are arranged along the first direction and extending along the second direction, and each of the second voltage dividing signal lines is loaded with a second voltage dividing signal;

wherein each of the first subpixels is electrically connected to one of the first voltage dividing signal lines, each of the second subpixels is electrically connected to one of the second voltage dividing signal lines, and each of the first subpixels and each of the second subpixels are electrically compensated.

13. The display device according to claim 12, wherein the first voltage dividing signal lines comprise common voltage signal lines, the second voltage dividing signal lines comprise share voltage signal lines, the first voltage dividing signal comprises a first alternating current signal, and the second voltage signal comprises a second alternating current signal.

14. The display device according to claim 13, wherein the first voltage dividing signal and the second voltage dividing signal are square wave signals, and an effective voltage signal of the first voltage dividing signal is equal to an effective voltage signal of the second voltage dividing signal.

15. The display device according to claim 14, wherein in a driving process of an n-th frame, the first voltage dividing signal is a peak signal of the first alternating current signal, the second voltage dividing signal is a valley signal of the second alternating current signal, and n is an integer greater than or equal to one.

16. The display device according to claim 15, wherein in driving processes of an (n−1)-th frame and an (n+1)-th frame, the first voltage dividing signal is a valley signal of the first alternating current signal, and the second voltage dividing signal is a peak signal of the second alternating current signal.

17. The display device according to claim 12, wherein the first subpixel group comprises at least two columns of the first subpixels, and the second subpixel group comprises at least two columns of the second subpixels;

between two adjacent columns of the first subpixels, one column of the first subpixels is positive frame driven, and the other column of the first subpixels is negative frame driven; and between two adjacent columns of the second subpixels, one column of the second subpixels is positive frame driven, and the other column of the second subpixels is negative frame driven.

18. The display device according to claim 17, wherein between two adjacent columns of the first subpixels and the second subpixels, one column of the first subpixels is positive frame driven, and one column of the second subpixels is negative frame driven; or one column of the first subpixels is negative frame driven, and one column of the second subpixels is positive frame driven.

19. The display device according to claim 12, wherein the display panel further comprises a plurality of data signal lines arranged along the first direction, and each of the data signal lines is electrically connected to a corresponding column of the first subpixels or a corresponding column of the second subpixels;

each of the first subpixels comprises a first primary pixel transistor, a first secondary pixel transistor, and a first share transistor, and each of the second subpixels comprises a second primary pixel transistor, a second secondary pixel transistor, and a second share transistor; and the first primary pixel transistor, the first secondary pixel transistor, the second primary pixel transistor, and the second secondary pixel transistor are electrically connected to one of the data signal lines, the first share transistor is electrically connected to one of the first voltage dividing signal lines, and the second share transistor is electrically connected to one of the second voltage dividing signal lines.

20. The display device according to claim 12, wherein a number of columns of the first subpixels in the first subpixel group is less than or equal to six, and a number of columns of the second subpixels in the second subpixel group is less than or equal to six.

* * * * *